May 22, 1934.   G. A. THOMSON   1,959,396
SPECTACLES
Filed Oct. 13, 1931

Inventor
G. A. Thomson
By C. A. Snow & Co.
Attorneys.

Patented May 22, 1934

1,959,396

UNITED STATES PATENT OFFICE 1,959,396

SPECTACLES

Gilbert A. Thomson, Coffeyville, Kans.

Application October 13, 1931, Serial No. 568,602

1 Claim. (Cl. 88—53)

This invention relates to spectacles and more particularly to the means for holding them in position for use, one of the objects being to provide temples or bows so constructed as to provide unobstructed side vision without sacrificing strength.

A further object is to provide temples each of which is connected to the lens or lens frame at widely spaced points whereby torsional strains along lines extending from side to side of the spectacles are resisted efficiently and danger of breakage of the lenses at their connections with the temples is reduced to the minimum.

Another object is to provide temples which can be assembled readily with the lenses to hold the spectacles at the desired angle to the nose.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

Figure 1:
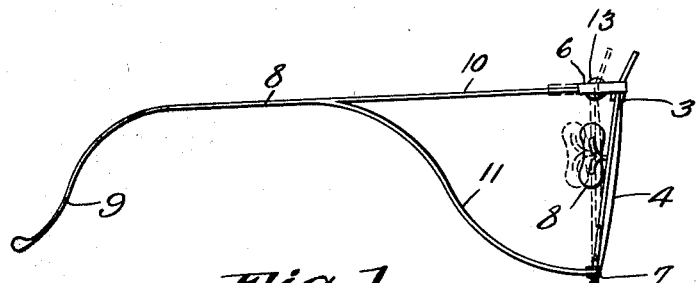
Figure 1 is a side elevation of the spectacles, one position to which the lenses can be adjusted angularly being indicated by a broken line.
Figure 2:
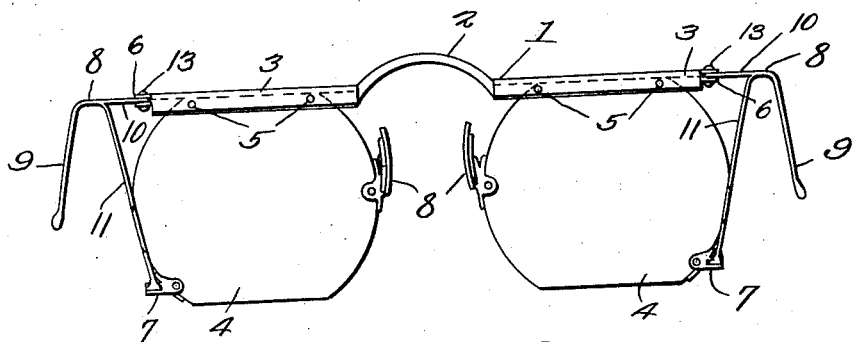
Figure 2 is a rear elevation.
Figures 3, 5:
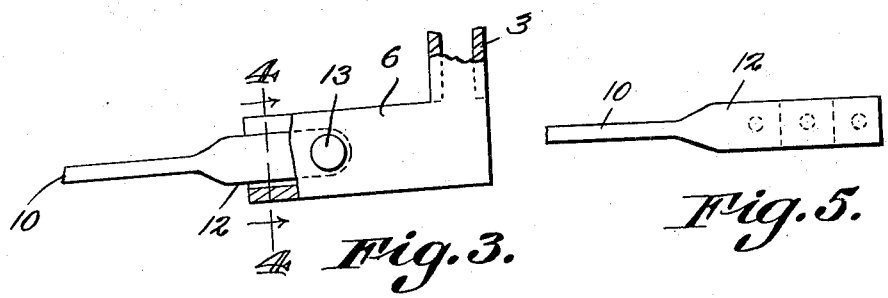
Figure 3 is an enlarged horizontal section through one end of the top bar, showing a portion of a temple therein.
Figure 5 is a plan view of one end portion of a temple, or bow.
Figure 4:
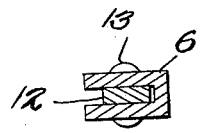
Figure 4 is a section on line 4—4, Figure 3.

Referring to the figures by characters of reference, 1 designates a cross bar having a central bridge 2 while the end portions can be channeled as at 3 to receive the upper edge of lenses 4 held thereto by rivets 5 or other suitable means.

The free ends of bar 1 are provided with rearwardly extended channeled ears 6 and fastened to the lower portion of each lens so as to extend under one of the ears 6 is a forked lug 7. Nose pieces 8 can be attached to the inner sides of the lenses if so desired.

Each of the temples or bows comprises a member 8 the rear end portion 9 of which is of the usual shape for engaging the head above and back of the ear. The front portion is forked to provide an upper arm 10 and a downwardly and forwardly extended lower arm 11. The upper arm is preferably, though not necessarily, straight while the lower arm can be curved. The forward end of arm 9, which is of a material which can be punctured readily, is flattened as at 12 for insertion into the channeled ear 6, where it is engaged by a pivot pin or rivet 13. The forward end of arm 11 extends into the lug 7 and is held thereto by a pivot pin or rivet in the usual way.

When the parts are assembled the plane of the lenses 4 is disposed at the minimum acute angle to the plane of the two arms 10. Such angle has been shown by full lines in Figure 1. Should it be found, when fitting the spectacles that the lenses require angular adjustment, the pins 13 can be removed, the requisite portion of the flat ends of arms 10 can be cut off, said ends punctured and reinserted into ears 6, and pivot pins or rivets 13 again inserted. After the proper angular adjustment of the lenses has been effected the spectacles will be properly held at all times and by providing the spaced arms 10 and 11 there is no obstruction to side vision. Furthermore, these arms cooperate to prevent torsional strains from side to side of the spectacles which heretofore frequently have resulted in breakage at the joints both in spectacles of the usual construction and, to a greater extent, in spectacles wherein the temples are attached to the upper portions only of the lenses or their frames.

What is claimed is:

Spectacles including connected lenses, forked temples having upper and lower arms providing clear side vision, loose hinge connections between the lower arms of the forks and the lower portions of the lenses, the upper arm of each fork having an elongated flattened portion thin enough to be easily pierced and disposed in a plane extending transversely of the spectacles, and a pivotal connection between the flat portion of each upper arm and the upper portion of a lens, each flattened portion being adapted to be shortened and pierced to receive the connecting pivot when changed to another position, thereby to adjust the upper arm of each temple longitudinally to hold the lenses at a desired angle thereto.

GILBERT A. THOMSON.